(12) United States Patent
Valenti et al.

(10) Patent No.: US 6,276,421 B1
(45) Date of Patent: Aug. 21, 2001

(54) RELEASE SHEET APPLICATION APPARATUS

(75) Inventors: James P. Valenti, Lititz; Thomas C. Bair, Wrightsville, both of PA (US)

(73) Assignee: Armstrong World Industries, Inc., Lancaster, PA (US)

( * ) Notice: Subject to any disclaimer, the term of this patent is extended or adjusted under 35 U.S.C. 154(b) by 0 days.

(21) Appl. No.: 09/092,823

(22) Filed: Jun. 5, 1998

(51) Int. Cl.[7] ............................ B32B 31/00; B26D 1/00
(52) U.S. Cl. ................. 156/521; 156/361; 156/362; 156/494; 156/566; 156/256; 156/270; 156/285; 83/343
(58) Field of Search ............... 83/343, 346; 156/521, 156/361, 362, 522, 566, 567, 256, 270, 285, DIG. 2, 494, 519

(56) References Cited

U.S. PATENT DOCUMENTS

| | | | |
|---|---|---|---|
| 3,598,682 | 8/1971 | Califano et al. | 156/521 |
| 3,607,590 | 9/1971 | Califano et al. | 428/40.3 |
| 3,895,442 * | 7/1975 | Langford | 30/299 |
| 3,905,859 | 9/1975 | Patterson | 156/443 |
| 3,954,542 | 5/1976 | Solomon et al. | 156/360 |
| 3,955,481 | 5/1976 | Heitmann | 493/8 |
| 3,957,570 | 5/1976 | Helm | 156/519 |
| 4,029,537 | 6/1977 | Kish | 156/497 |
| 4,242,167 | 12/1980 | Hoffmann | 156/357 |
| 4,642,150 * | 2/1987 | Stemmler | 156/164 |
| 4,717,441 | 1/1988 | Seki et al. | 156/521 |
| 4,919,027 * | 4/1990 | Littleton | 83/107 |
| 5,053,096 * | 10/1991 | Long et al. | 156/157 |
| 5,122,212 | 6/1992 | Ferguson et al. | 156/209 |
| 5,230,267 * | 7/1993 | Abler | 83/23 |
| 5,344,519 | 9/1994 | Galchefski et al. | 156/456 |
| 5,380,381 | 1/1995 | Otruba | 156/64 |
| 5,413,651 | 5/1995 | Otruba | 156/64 |
| 5,518,569 | 5/1996 | Achilles et al. | 156/250 |
| 5,709,143 * | 1/1998 | Bentley | 100/5 |

\* cited by examiner

Primary Examiner—Linda L. Gray

(57) ABSTRACT

An apparatus for applying sheets to substrates including a rotating blade roller with a blade on its surface; a vacuum roller rotating with the blade roller, oriented parallel to the blade roller, and with a surface adjacent to the blade roller surface; at least one slot in the vacuum roller surface into which the blade is inserted as the rollers rotate; and a feeder for feeding a continuous sheet between the rollers so that the sheet is cut into segments. The vacuum roller surface includes surface holes connected to a vacuum source during cutting and disconnected after cutting and manifold holes parallel to the roller axis and located in a circle below the surface. The manifold holes have open ends located at one end of the vacuum roller and are connected to the surface holes. There is at least one plate adjacent the end of the vacuum roller with the open ends. The plate includes at least two curved grooves on the surface matching the shape of the path traveled by the open ends. One of the grooves is connected to the vacuum source, and the other is connected to a positive pressure source. The end plate includes a threading groove attached to a vacuum source and located adjacent to a portion of rotation of the vacuum roller which precedes the location at which the sheet first contacts the vacuum roller. The threaded groove matches the shape of the path traveled by the open ends.

5 Claims, 2 Drawing Sheets

RELEASE SHEET APPLICATION APPARATUS

BACKGROUND OF THE INVENTION

This invention relates generally to floor tile products and more specifically to an apparatus for cutting cover sheets and aligning them with adhesive coated floor tiles in order to protect the adhesive during storage and shipment.

Nothing has encouraged the do-it-yourselfer to lay floors more than the availability of tiles with preapplied adhesive. It means that the homeowner need only peel a piece of paper from the adhesive coated back of a floor tile, lay it in place, and press it down onto the underlying surface. However, those of us performing that simple task rarely consider the complicated effort involved in delivering the tiles to us. Not only must the tile be produced in its normal fashion, but the adhesive must be applied to it, and then the adhesive must be covered by the paper sheet to prevent it from sticking to other tiles in the packing box or simply becoming too dirty to maintain its own adhesive properties.

The process of laminating the backing sheet, the "release sheet", to the tiles has usually involved the use of paper which is cut into tile size sheets and then aligned with the tiles. The adhesive can be preapplied to either the tiles or the paper. It is actually desirable to use some sort of plastic film as the release sheet because such materials are stronger and less expensive, but plastic film has been difficult to use in existing high speed laminating equipment because of the dimensional instability of the film, particularly its tendency to stretch when being cut.

Virtually all the machines with high speed cutting of release sheets use a blade oriented parallel to the axis of a rotating roller with the blade on the surface of the roller and engaging the paper as the paper is pinched between the blade and an anvil on another rotating roller. Such an arrangement operates satisfactorily for paper, but will not work with stronger plastic film. The film will either simply not be cut, or, if it does cut, it will also stretch. Under either circumstance subsequent registration with the tiles is unsatisfactory.

There is a clear need for an apparatus which will cut plastic film without changing its dimension, so that the film can be placed into registry with floor tiles and laminated to them.

SUMMARY OF THE INVENTION

The present invention is a machine which synchronizes a serrated blade mounted upon a roller with a mating roller with a slot, with the slotted roller including a vacuum apparatus which holds the film tightly against the roller on both sides of the slot. The cut is then accomplished by the serrated blade acting on the film held tautly over the slot. The vacuum holding feature during the cutting operation assures a clean cut of the film with no dimensional change. Then, as the vacuum roller continues to rotate, after part of the film is attached to the tile, the roller surface switches over from vacuum to pressure, and the release of the film from the vacuum roller is facilitated, particularly if, as at start up, there is no tile present to which the film can be attached.

The roller with the blade and the vacuum roller are synchronized with the tile feeding system so that the region adjacent to the leading edge of the cut film piece actually contacts the tile and is pressed onto it before the blade cuts the trailing end of the film piece. This timing also helps the film to properly separate from the roller because the adhesive bond between the floor tile and the film and the continuing motion of the tile helps pull the film from the roller.

Although the invention is absolutely necessary for the cutting of plastic films, it also works very well with the traditional paper release sheets. Therefore, existing production facilities can be converted to include the invention and the conversion to the use of plastic film can be accomplished.

The present invention thereby furnishes a means for reducing production costs by the use of less expensive release sheet materials.

DETAILED DESCRIPTION OF THE INVENTION

Figure 1:
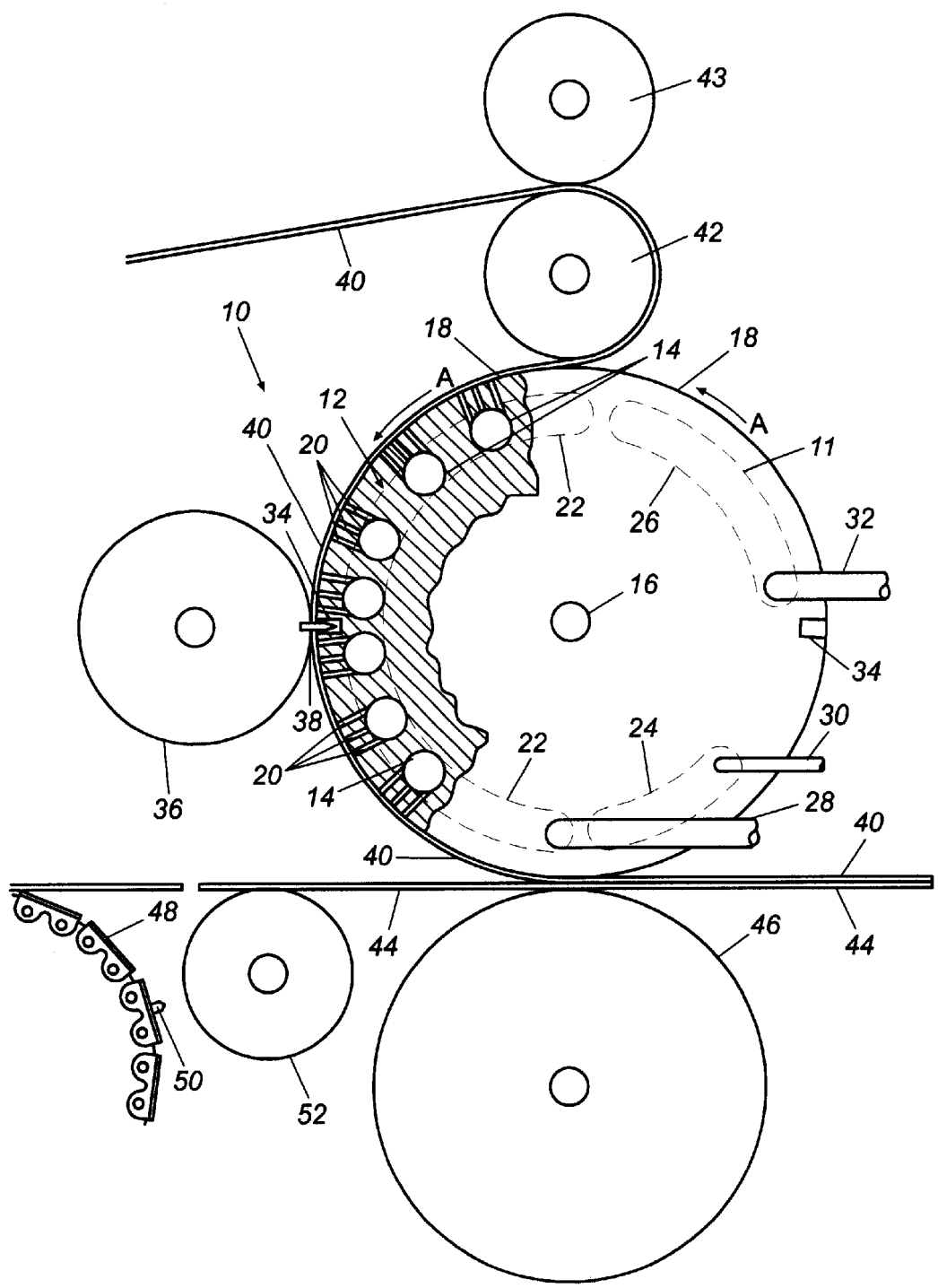
FIG. 1 is a side assembly view of the preferred embodiment of the invention with a partial cut-away of an end plate and a partial cross section of the vacuum roller.

FIG. 1 is a side assembly view of the preferred embodiment of release sheet laminator 10 with a partial cut-away of end plate 11 and a partial cross section of vacuum roller 12.

Vacuum roller 12 is constructed with a network of manifolds 14 all around it just below cylindrical surface 18. Manifolds 14 are oriented parallel to roller axis 16, and each of the manifolds 14 has multiple holes 20 along its entire length, with holes 20 interconnecting manifolds 14 to roller surface 18.

Vacuum roller 12 and the various other rollers shown in FIG. 1 all have significant length extending in the direction perpendicular to the plane in which they are shown. The lengths are always greater than the width of the floor tile being laminated to the release sheet, and are therefore approximately fifteen inches long for a machine that laminates twelve inch wide tiles. For a machine processing twelve inch wide tiles, manifolds 14 are approximately thirteen inches long and holes 20 cover the entire surface 18 of vacuum roller 12 for the entire thirteen inch width.

Vacuum roller 12 is located and rotates between two stationary end plates, but only one end plate 11 is seen in FIG. 1. It is end plate 11 which enables vacuum roller 12 to switch back and forth between vacuum to hold the release sheet and pressure to release it. End plate 11 has curved grooves 22, 24, and 26 formed into it. Grooves 22, 24, and 26, shown in dashed lines in FIG. 1, are formed on the surface of end plate 11 which is facing inward and is adjacent to the end surface of vacuum roller 12, and the open ends of manifolds 14 within vacuum roller 12 align with grooves 22, 24, and 26. The location of groove 22 relative to manifolds 14 in the cut-away portion is shown with phantom lines. Thus, as vacuum roller 12 rotates, the particular groove at which any manifold 14 is located determines the atmosphere to which the manifold and all its connected holes is subjected.

Groove 22 is pumped to a vacuum through tubing 28 by a conventional vacuum source (not shown), and groove 24 is supplied with compressed air through tubing 30. Groove 26 is also pumped to a vacuum through tubing 32.

Vacuum roller 12 also includes two slots 34 on its surface at opposite ends of a common diameter. However, the number of slots and their location is determined by the size relationship between vacuum roller 12 and blade roller 36, and can be fewer or greater than the two shown. Blade roller 36 carries blade 38, which moves into slots 34 on vacuum roller 12 as blade roller 36 turns in synchronism with vacuum roller 12. It is the motion of blade 38 into slot 34 which cuts release sheet 40 which is stretched taut across slot 34 because it is held in place by the vacuum applied to holes 20 on surface 18 of vacuum roller 12. Because release sheet 40 is held tightly on either side of slot 34, blade 38 easily cuts the release sheet and no significant stretching occurs.

In operation, vacuum roller 12 rotates counterclockwise as indicated by arrows A, and release sheet 40 is fed onto vacuum roller 12 at feed roller 42 from a supply roll (not shown). Feed roller 42 and pinch roller 43, which is held tightly against feed roller 42, control the speed at which film 40 is supplied to vacuum roller 12. Release sheet 40 is held onto vacuum roller 12 by the vacuum supplied through holes 20 and manifolds 14 as manifolds 14 are aligned with vacuum groove 22. As blade 38 rotates into alignment with slot 34, which is the position shown in FIG. 1, blade 38 cuts release sheet 40. Then, as vacuum roller 12 rotates, the manifolds holding the leading edge of release sheet 40, those just above slot 34 in FIG. 1, move into alignment with pressure groove 24, which removes the vacuum on holes 20 and replaces it with positive pressure.

At this time, release sheet 40, which has already been placed into contact with adhesive coated tile 44 as they met between vacuum roller 12 and exit roller 46, moves away from vacuum roller 12, as release sheet 40 is pulled by the adhesive on tile 44 and pushed by the air pressure applied to holes 20 from pressure groove 24.

Optional threading groove 26 supplies an action which is only required during startup of release sheet laminator 10. When the machine is to be started, release sheet 40 is pulled over feed roller 42, but it is not necessary to thread it between feed roller 42 and vacuum roller 12. Merely laying release sheet 40 over the portion of vacuum roller 12 which is affected by threading groove 26 is sufficient to enable the machine to thread itself. When vacuum is applied to threading groove 26 and rotation begins in direction A, release sheet 40 is held tightly against vacuum roller 12 and pulled through between feed roller 42 and vacuum roller 12, thus beginning the travel of the entire length of release sheet 40.

An important requirement for the operation of the invention is the proper synchronization of vacuum roller 12 with the movement of floor tile 44. The goal of this synchronization is to have the leading edge of every tile 44 meet the region adjacent to the leading edge of cut release sheet 40 just as they enter the junction of vacuum roller 12 and exit roller 46. This is accomplished by synchronizing the rotation of vacuum roller 12 with the linear motion of tile feed conveyor 48, and by including pins 50 at intervals along conveyor 48 which assure that there is no slipping of the tiles on conveyor 48. In the preferred embodiment, vacuum roller 12 and tile feed conveyor 48 are driven by servo motors whose speeds are controlled by a computer to assure that the tile and release sheet meet properly, but other synchronization means are possible. Idler roller 52 between conveyor 48 and exit roller 46 is present to assure that tile 44 is kept flat, but many other means of accomplishing that are available.

Pinch roller 43 and feed roller 42 are also independently synchronized with the movement of the tiles and independently driven. This permits independent control of the tension on film 40 as it is fed onto vacuum roller 12 and also furnishes control over the length of the cut film pieces.

Figure 2:
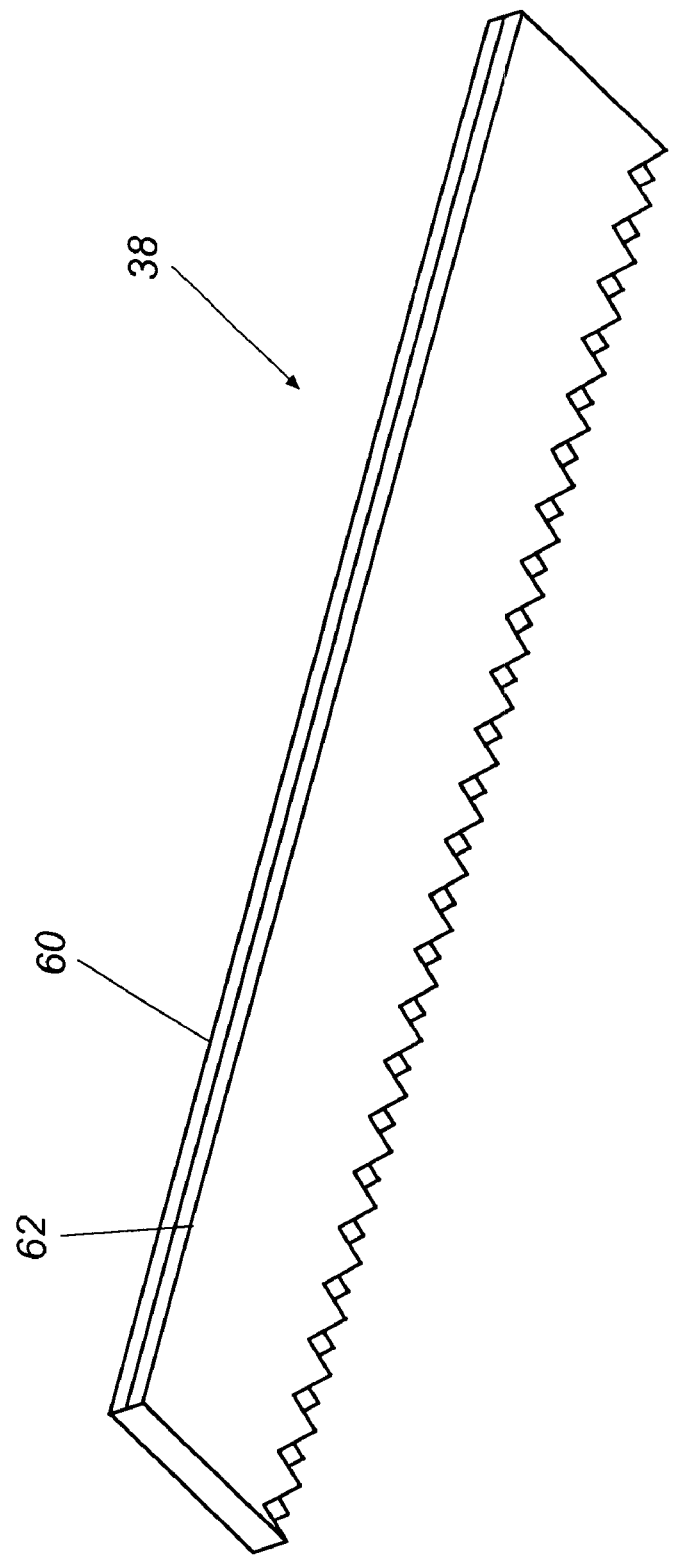
FIG. 2 is a perspective view of the serrated cutting blade.

FIG. 2 is a perspective view of serrated cutting blade 38 of the preferred embodiment. In the preferred embodiment, cutting blade 38 is actually constructed of two separate serrated blades 60 and 62 which are attached to each other. The two blades are attached with the teeth of each blade offset from the teeth of the other so that the effect is of a finer toothed blade, but the manufacture of the blades is made easier because they each have coarser teeth. The effect of the serrated blade on cutting the release sheet, particularly a release sheet of plastic film, is to produce multiple punctures in the sheet, with each puncture being enlarged as the blade travels through the sheet and into the slot on vacuum roller 12, until the sheet in completely cut through. Thus, there is no tendency of the sheet to stretch, which might prevent the film from being cut or cause misalignment with the tile to which the film will be laminated. Moreover, since the teeth of serrated blades 60 and 62 do not contact an anvil, the teeth do not wear as quickly as prior art blades.

The present invention thereby furnishes an apparatus for consistently cutting and laminating release sheets onto tile, even release sheets made from plastic film.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, vacuum roller 12 and blade roller 36 could be made either larger or smaller, or treading groove 26 could be omitted.

What is claimed as new and for which Letters Patent of the United States are desired to be secured is:

1. An apparatus for applying sheets to substrates comprising:
   (A) a rotating blade roller with a blade means protruding from its surface;
   (B) a vacuum roller rotating in synchronism with the blade roller, oriented parallel to the blade roller, with the vacuum roller surface located adjacent to the blade roller surface, the vacuum roller having:
      at least one slot in the vacuum roller surface into which the blade means is inserted as the blade roller and the vacuum roller rotate, and
      the vacuum roller surface including multiple surface holes interconnected to a source of vacuum when the surface holes are located within a first portion of the rotation of the vacuum roller which includes the portion during which the blade means is inserted into the slot, and with the surface holes disconnected from the source of vacuum when the surface holes are located within a second portion of the rotation of the vacuum roller which includes a portion after the blade means is removed from the slot; and
      the vacuum roller having manifold holes which are parallel to the roller axis, located on a circle below the cylindrical surface, with open ends of the manifold holes located at one end of the vacuum roller, and with the surface holes connected to the manifold holes;
   (C) means for feeding a continuous sheet between the blade roller and the vacuum roller so that the sheet is cut into segments; and
   (D) at least one end plate adjacent to the end of the vacuum roller with the open ends of the manifold holes, the end plate including at least two curved grooves on the end plate surface which is adjacent to the roller, with the grooves matching the shape of the path travelled by the open ends of the manifold holes, with one of the grooves interconnected with the source of vacuum, and the other groove interconnected with a source of positive pressure; and wherein the end plate further includes a threading groove attached to a source of vacuum, with the threading groove located adjacent to a portion of the rotation of the vacuum roller which precedes the location at which the sheet first contacts the vacuum roller, and the threading groove matching the shape of the path travelled by the open ends of the manifold holes.

2. The apparatus of claim 1 further including:

an exit roller parallel to and located adjacent to the vacuum roller in the second portion of rotation of the vacuum roller; and a substrate feed means for supplying the substrate to the location at which the vacuum roller and the exit roller are closest.

3. The apparatus of claim 2 further including means to synchronize the vacuum roller and the substrate feed means so that the leading edges of the cut segments of the sheet and selected points on the substrate meet between the vacuum roller and the exit roller.

4. The apparatus of claim 2 wherein the means for feeding a continuous sheet between the blade roller and the vacuum roller is a feed roller and a pinch roller held tightly against the feed roller, and the feed roller and pinch roller are independently driven and independently controlled relative to the substrate feed means to control the tension on the sheet.

5. The apparatus of claim 1 wherein the blade means is serrated and formed from two separate serrated blades attached together with the teeth of each blade offset from the teeth of the other blade.

* * * * *